United States Patent [19]

Inoue

[11] Patent Number: 5,235,477
[45] Date of Patent: Aug. 10, 1993

[54] TRACK POSITION DETECTING MECHANISM

[75] Inventor: Kazuhiko Inoue, Hoya, Japan

[73] Assignee: TEAC Corporation, Tokyo, Japan

[21] Appl. No.: 908,170

[22] Filed: Jul. 2, 1992

Related U.S. Application Data

[63] Continuation of Ser. No. 637,164, Jan. 3, 1991, Pat. No. 5,177,648, which is a continuation of Ser. No. 252,733, Oct. 3, 1988, Pat. No. 5,038,283.

[30] Foreign Application Priority Data

Oct. 7, 1987 [JP] Japan .................................. 62-153681

[51] Int. Cl.$^5$ .............................................. G11B 5/55
[52] U.S. Cl. ..................................... 360/75; 360/78.11
[58] Field of Search ................. 360/75, 77.03, 78.01, 360/78.11, 78.13, 78.14, 105, 106, 78.04, 109

[56] References Cited

U.S. PATENT DOCUMENTS

| | | | |
|---|---|---|---|
| 4,737,867 | 4/1988 | Ishikawa et al. | 360/75 |
| 4,780,778 | 10/1988 | Gunji et al. | 360/109 |
| 5,051,834 | 9/1991 | Iwanaga | 360/105 |
| 5,083,230 | 1/1992 | Nishioka | 360/78.04 |

*Primary Examiner*—Jerry Smith
*Assistant Examiner*—Steven R. Garland
*Attorney, Agent, or Firm*—Marmorek, Guttman & Rubenstein

[57] ABSTRACT

A track position detecting mechanism is used to detect an outermost peripheral track position of a magnetic disc for use as a reference point in making various accesses to the magnetic disc. The track position detecting mechanism has an optical detector including a light emitting element and a light receiving element, where an optical path is formed between the light emitting element and the light receiving element, and an interrupt member provided at such a position on a carriage that the interrupt member interrupts the optical path within the optical detector when a magnetic head is located at an outermost peripheral track position on the magnetic disc. The optical path substantially coincides with a plane which includes a center line of a guide shaft which guides the carriage, and the plane is parallel to a base of the carriage.

2 Claims, 4 Drawing Sheets

TRACK POSITION DETECTING MECHANISM

This is a continuation of application Ser. No. 07/637,164, filed Jan. 3, 1991, now U.S. Pat. No. 5,177,648, which is a continuation of application Ser. No. 07/252,733, filed Oct. 3, 1988, now U.S. Pat. No. 5,038,283.

BACKGROUND OF THE INVENTION

The present invention generally relates to track detecting mechanisms, and more particularly to a track position detecting mechanism of a magnetic disc recording and/or reproducing apparatus for detecting an outermost peripheral track position during an initializing operation of the magnetic disc recording and/or reproducing apparatus.

FIG. 1 shows an example of a conventional track position detecting mechanism used in a magnetic disc recording and/or reproducing apparatus (hereinafter simply referred to as a disc apparatus). A carriage 1 has a magnetic head 2a provided on a base 1a thereof, and a magnetic head 2b which is provided on a lower surface of an upper head arm 3. The carriage 1 engages a lead screw 5 which is driven by a motor 4. Accordingly, the carriage 1 moves in a radial direction X of a magnetic disc (not shown) depending on a rotation quantity of the lead screw 5, and the magnetic heads 2a and 2b make sliding contact with recording surfaces of the magnetic disc. A recording region on the recording surface is defined by an innermost peripheral track and an outermost peripheral track on the magnetic disc. The lead screw 5 penetrates one side portion of the carriage 1 while a guide shaft 6 penetrates the other side portion of the carriage 1. The carriage 1 moves under the guidance of the guide shaft 6.

During an initializing operation of the disc apparatus, it is necessary to detect the outermost peripheral track (track "00" as a reference point. This reference point is used as a reference in determining track positions on the magnetic disc during a recording mode or a reproducing mode of the disc apparatus. This outermost peripheral track is detected when a projecting member 1b which projects upwardly from the base 1a of the carriage 1 enters within a slit 7a of an optical detector 7 and interrupts an optical path within the optical detector 7 between a light emitting element (not shown) and a light receiving element (not shown) which constitute the optical detector 7. The optical detector 7 is mounted on a lower surface of a plate 8 which is indicated by a one-dot chain line and is fixed to a base (not shown) of the disc apparatus. The position of the optical detector 7 is fixed after a relative position between the optical detector 7 and the projecting member 1b is appropriately adjusted.

In an initial state of the disc apparatus and when a power failure occurs during operation of the disc apparatus, for example, the magnetic heads 2a and 2b are automatically moved to the outermost peripheral track positions on the respective recording surfaces of the magnetic disc. In the conventional track position detecting mechanism, measures are taken so as to facilitate the loading and unloading of the magnetic disc when the magnetic heads 2a and 2b are located at the outermost peripheral track positions on the respective recording surfaces of the magnetic disc. In other words, a rod 9 moves in a direction Y and makes contact with an arm portion 3a of the upper head arm 3 which is urged downwardly by a torsion spring 10, thereby bending a leaf spring 3b which supports the upper head arm 3 and separating the magnetic head 2b from the magnetic head 2a. When the separation of the magnetic heads 2a and 2b takes place, a force due to a pivotal displacement of the upper head arm 3 acts on the carriage 1 in the upward direction, and a slight resilient deformation occurs in the guide shaft 6. For this reason, the projecting member 1b of the carriage 1 is also slightly inclined or displaced due to the resilient deformation of the guide shaft 6. When the projecting member 1b is slightly inclined or displaced, a timing with which the optical path within the optical detector 7 is interrupted by the projecting member 1b varies slightly, and there is a problem in that an error is introduced in the detection of the outermost peripheral track position. When such an erroneous detection of the outermost peripheral track position occurs, all accesses made during the operating mode of the disc apparatus will be made to an erroneous track position since each access refers to the reference point (that is, the outermost peripheral track position).

For example, it is conceivable to make the diameter of the guide shaft 6 large and make the guide shaft 6 rigid so that the guide shaft 6 will not undergo a resilient deformation even when the above described force acts on the carriage 1. However, in this case, a resistance against a sliding motion of the carriage 1 increases due to the increased outer peripheral surface of the guide shaft 6, and the motor 4 must have a large torque in order to drive the carriage 1. Consequently, the size of the motor 4 increases and there is a problem in that the track position detecting mechanism as a whole becomes bulky because of the large-diameter guide shaft 6 and the large motor 4. It is highly undesirable that the track position detecting mechanism is bulky since the track position detecting mechanism must usually be accommodated within a limited space inside the disc apparatus.

On the other hand, it is also conceivable to use such a rigid material for the guide shaft 6 that no resilient deformation will occur even when the above described force acts on the carriage 1. But at the present, a highly rigid material suited for used in the guide shaft 6 is expensive, and there is no available material that meets the rigidity requirement and is also satisfactory cost-wise.

SUMMARY OF THE INVENTION

Accordingly, it is a general object of the present invention to provide a novel and useful track position detecting mechanism in which the problems described above are eliminated.

Another and more specific object of the present invention is to provide a track position detecting mechanism for a magnetic disc recording and/or reproducing apparatus having at least a magnetic head for recording and/or reproducing signals on and/or from a magnetic disc, where the track position detecting mechanism comprises a carriage having the magnetic head mounted on a base thereof and movable in a radial direction of the magnetic disc, guide means including a guide shaft which extends in the radial direction of the magnetic disc for guiding the carriage, driving jeans for driving the carriage in the radial direction of the magnetic disc under a guidance of the guide means, optical detector means including a light emitting element and a light receiving element, which optical detector means has a fixed position and forms an optical path between the light emitting element and the light receiving element, and an interrupt member provided on the carriage at such a position that the interrupt member interrupts the optical path within the optical detector means when the magnetic head is located at an outermost peripheral track position on the magnetic disc. The optical path approximately coincides with a plane which includes a center line of the guide shaft, where the plane is parallel to the base of the carriage. According to the track position detecting mechanism of the present invention, it is possible to detect the outermost peripheral track position with a high accuracy, and the reliability of the magnetic disc recording and/or reproducing apparatus is improved.

Still another object of the present invention is to provide a track position detecting mechanism for a magnetic disc recording and/or reproducing apparatus having at least a magnetic head for recording and/or reproducing signals on and/or from a magnetic disc, where the track position detecting mechanism comprises a carriage having the magnetic head mounted on a base thereof and movable in a radial direction of the magnetic disc, guide means including a guide shaft which extends in the radial direction of the magnetic disc for guiding the carriage, driving means for driving the carriage in the radial direction of the magnetic disc under a guidance of the guide means, optical detector means including a light emitting element and a light receiving element, the optical detector means having a fixed position, and an interrupt member having a reflecting surface and provided on the carriage at such a position that the interrupt member forms an optical path between the light emitting element and the light receiving element of the optical detector means by reflecting a light emitted from the light emitting element towards the light receiving element at the reflecting surface thereof when the magnetic head is located at an outermost peripheral track position on the magnetic disc. The reflecting surface approximately coincides with a plane which includes a center line of the guide shaft, where the plane is parallel to the base of the carriage. According to the track position detecting mechanism of the present invention, it is possible to detect the outermost track position with a high accuracy.

Other objects and further features of the present invention will be apparent from the following detailed description when read in conjunction with the accompanying drawings.

DETAILED DESCRIPTION

Figure 2:
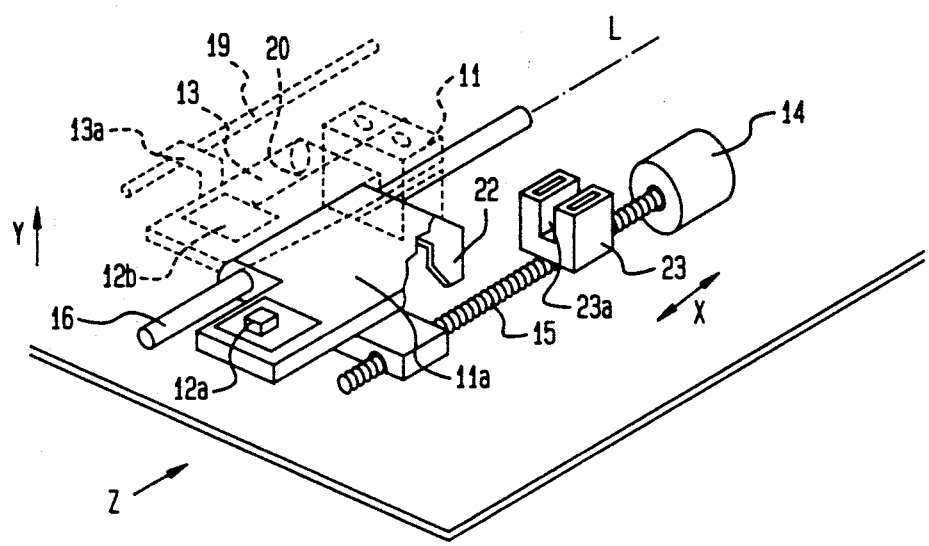
FIG. 2 is a perspective view showing an essential part of an embodiment of a track position detecting mechanism according to the present invention.

FIG. 2 shows an essential part of an embodiment of a track position detecting mechanism according to the present invention. A carriage 11 has a magnetic head 12a and a magnetic head 12b which is provided on a lower surface of an upper head arm 13, and the carriage 11 engages a lead screw 15 which is driven by a motor 14. Accordingly, the carriage 11 moves in a radial direction X of a magnetic disc (not shown) depending on a rotation quantity of the lead screw 15, and the heads 12a and 12b make sliding contact with recording surfaces of the magnetic disc. The lead screw 15 penetrates one side portion of the carriage 11 while a guide shaft 16 penetrates the other side portion of the carriage 11. For convenience sake, the upper head arm 13 and the like are indicated by phantom lines so as to facilitate the understanding of the structure.

The upper head arm 13 has an arm portion 13a and is urged downwardly by a torsion spring 20. Hence, a leaf spring 13b which supports the upper head arm 13 is bent when the head 12b is caused to separate from the head 12a against a force of the torsion spring 20 when a rod 19 moves in a direction Y and makes contact with the arm portion 13a of the upper head arm 13.

Figure 3:
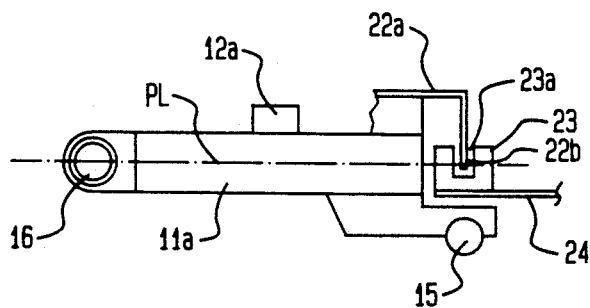
FIG. 3 is a front view of the track position detecting mechanism shown in FIG. 2 viewed from a direction Z.

An L-shaped interrupt member 22 projects downwardly from a base 11a of the carriage 11. The L-shaped interrupt member 22 is integrally formed on the base 11a which is made of a synthetic resin, for example. As shown in FIG. 3 which shows the track position detecting mechanism in an operating position from a direction Z in FIG. 2, the L-shaped interrupt member 22 is made up of an arm portion 22a which projects sidewardly from the base 11a, and a portion 22b which extends downwardly from a tip end of the arm portion 22a. When the magnetic disc is loaded, it is possible to carry out a signal recording and/or reproduction on and/or from the magnetic disc when the track position detecting mechanism is in the operating position.

An optical detector 23 has an approximate U-shape and is made up of mutually confronting light emitting element (not shown) and light receiving element (not shown). The optical detector 23 is arranged so that the U-shape is upright. The optical detector 23 outputs a detection signal when a light path between the light emitting element and the light receiving element is interrupted, that is, when a light emitted from the light emitting element is blocked and does not reach the light receiving element. A mounting position of the optical detector 23 on a plate 24 is adjusted and fixed so that the portion 22b of the L-shaped interrupt member 22 enters 12a and 12b are located at the respective outermost peripheral track positions on the magnetic disc. In addition,, the optical detector 23 is positioned so that the optical path between the light emitting element and the light receiving element of the optical detector 23 is located on the same plane PL. The plane PL is parallel to the base 11a and includes a center line L which passes a center of the guide shaft 16. The center line L is indicated by a one-dot chain line in FIG. 3.

Figure 4:
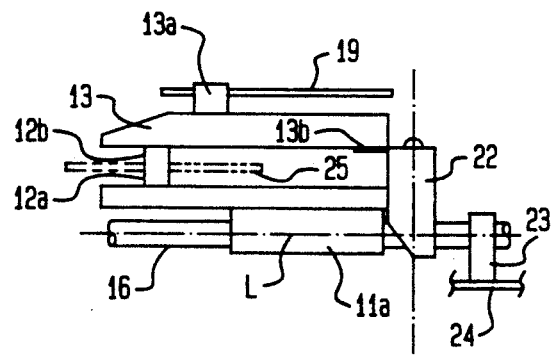
FIG. 4 is a side view showing the track position detecting mechanism shown in FIG. 2 in an operating position.
Figure 5:
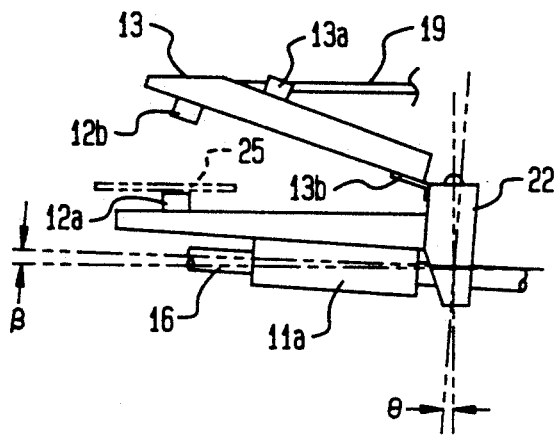
FIG. 5 is a side view showing the track position detecting mechanism shown in FIG. 2 in a disc load/eject position.

FIG. 4 shows the track position detecting mechanism shown in FIG. 2 in an operating position, and FIG. 5 shows the track position detecting mechanism in a disc load/eject position. When a magnetic disc 25 indicated by a one-dot chain line is loaded into the disc apparatus as shown in FIG. 4, the upper head arm 13 assumes a position pivoted counterclockwise due to the action of the torsion spring 20, and the heads 12a and 12b are in contact with the respective recording surfaces of the disc 25. On the other hand, when loading the disc 25 into the disc apparatus or unloading the disc 25 from the disc apparatus, the rod 19 moves in a direction Y and pushes the arm portion 13a of the upper head arm 13, thereby pivoting the upper head arm 13 clockwise against the action of the torsion spring 20. When pivoting the upper head arm 13 clockwise, the heads 12a and 12b are located at respective outermost peripheral track positions (track "00") on the recording surfaces of the disc 15. The rod 19 may be moved by a known means and description and illustration thereof will be omitted. For example, one end of the rod 19 is mechanically coupled to a load/eject button of the disc apparatus, and the rod 19 moves in the direction Y when the load/eject button is manipulated.

The upper head arm 13 is supported on the carriage 11 through the leaf spring 13b, and a force acts on the carriage 11 when the upper head arm 13 pivots. For this reason, the guide shaft 16 which penetrates the base 11a of the carriage 11 inevitably undergoes a resilient deformation as indicated by a one-dot chain line in FIG. 5. A displacement angle of the guide shaft 16 caused by the resilient deformation is denoted by $\beta$. As a result, The L-shaped interrupt member 22 is inclined by an angle $\theta$ due to the resilient deformation of the guide shaft 16.

During an initializing operation of the disc apparatus, it is necessary to detect the outermost peripheral track as a reference point. This reference point is used as a reference in determining track positions on the disc 25 during a recording mode or a reproducing mode of the disc apparatus. This outermost peripheral track position is detected when the L-shaped interrupt member 22 enters within the slit 23a of the optical detector 23 and interrupts the optical path within the optical detector 23, whereby the optical detector 23 outputs the detection signal.

Figure 1:
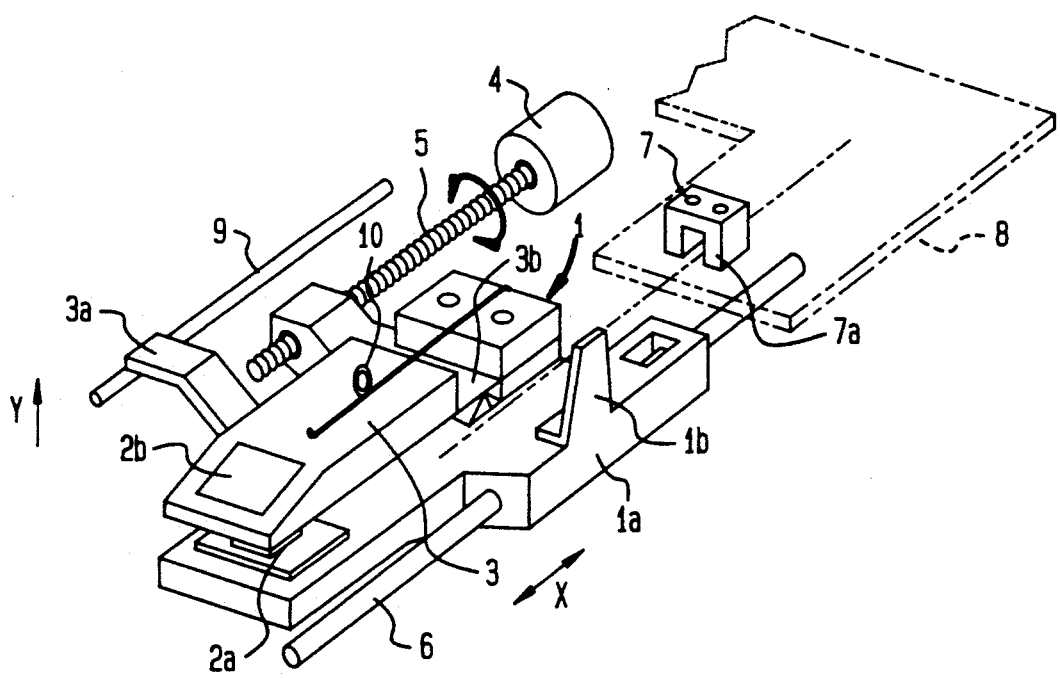
FIG. 1 is a perspective view showing an essential part of an example of a conventional track position detecting mechanism.
Figure 6:
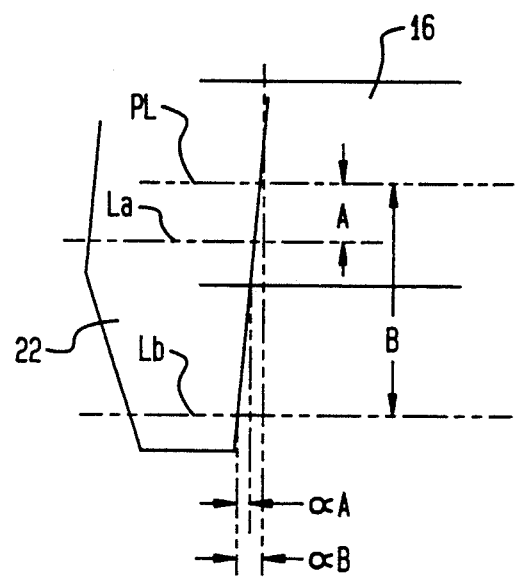
FIG. 6 shows a portion of a guide shaft and a position of an L-shaped interrupt member on an enlarged scale for explaining an error in the detection of the outermost peripheral track position caused by a resilient deformation of a guide shaft.

FIG. 6 shows a portion of the guide shaft 16 and a position of the L-shaped interrupt member 22 on an enlarged scale for explaining an error in the detection of the outermost peripheral track position caused by the resilient deformation of the guide shaft 16. When detecting the outermost peripheral track position, the following displacements take place with reference to the plane PL due to the inclination of the L-shaped interrupt member 22. For example, in a case where an optical path $L_A$ within the optical detector 23 is a distance A from the plane PL along a direction perpendicular to the plane PL, an error $\alpha_A$ occurs in the detection of the outermost peripheral track position using the optical path $L_A$. Similarly, in a case where an optical path $L_B$ within the optical detector 23 is a distance B from the plane PL along the direction perpendicular to the plane PL, an error $\alpha_B$ occurs in the detection of the outermost peripheral track position using the optical path $L_A$. As may be seen from FIG. 6, B is greater than A and $\alpha_B$ is greater than $\alpha_A$, and the error in the detection of the outermost peripheral track position becomes larger as the distance between plane PL and the optical path of the optical detector 23 increases. In the conventional track position detecting mechanism described before in conjunction with FIG. 1, the optical path of the optical detector is located the distance B from the plane PL, for example, and the error in the detection of the outermost peripheral track position is considerably large.

Accordingly, in this embodiment, the distance A between the optical path $L_A$ of the optical detector 23 and the plane PL is set to an extremely small value. The error in the detection of the outer peripheral track position is minimized when the distance A is zero, that is, when the optical path $L_A$ coincides with the plane PL. In this case, it is possible to detect the outermost peripheral track position with an extremely high accuracy.

In some cases, the structure of the disc apparatus makes it impossible to make the optical path $L_A$ coincide with the plane PL. However, it is still possible to detect the outermost peripheral track position with a high accuracy by setting the distance A to a small value, that is, locating the optical $L_A$ close to and parallel to the plane PL. Accordingly, the distance A may be set depending on a tolerable range of the error in the detection of the outermost peripheral track position.

Figure 7:
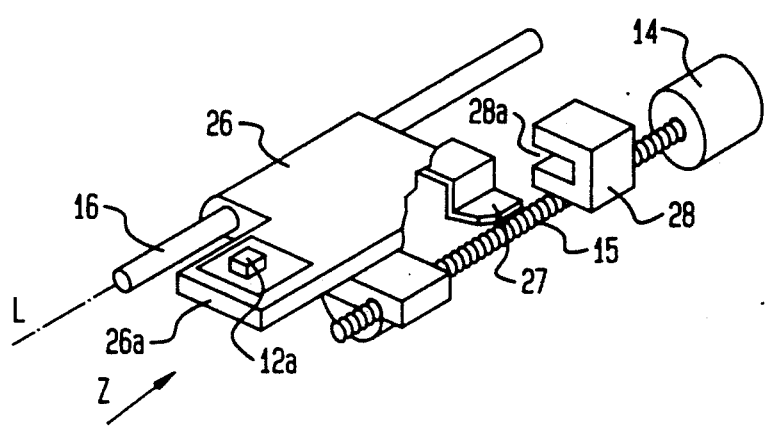
FIG. 7 is a perspective view showing an essential part of another embodiment of the track position detecting mechanism according to the present invention.
Figure 8:
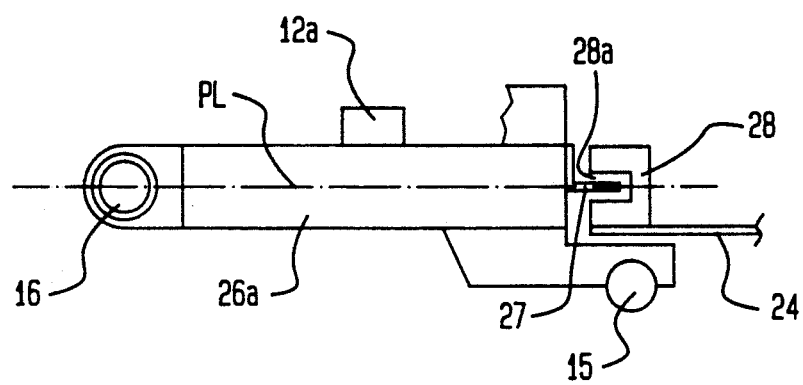
FIG. 8 is a front view of the track position detecting mechanism shown in FIG. 7 viewed from the direction Z.

Next, a description will be given of another embodiment of the track position detecting mechanism according to the present invention, by referring to FIGS. 7 and 8. In FIGS. 7 and 8, those parts which are essentially the same as those corresponding parts in FIGS. 2 through 6 are designated by the same reference numerals, and a description thereof will be omitted.

In FIG. 7, an L-shaped interrupt member 27 projects sidewardly from a rear portion of a base 26a of a carriage 26. As shown in FIG. 8, a tip end portion of the L-shaped interrupt member 27 coincides with the plane PL which is parallel to the base 11a and includes a center line L which passes a center of the guide shaft 16. An approximately U-shaped optical detector 28 is arranged sideways as shown. The mounting position of the optical detector 28 is fixed after a relative position between the optical detector 28 and the L-shaped interrupt member 27 is appropriately adjusted so that an optical path between a light emitting element and a light receiving element of the optical detector 28 is interrupted by the L-shaped interrupt member 27 which enters a slit 28a at the outermost peripheral track position.

Accordingly, even when the guide shaft 16 undergoes a resilient deformation, the inclination of the L-shaped interrupt member 27 located on the plane PL is extremely small. Hence, when the upper head arm 13 is pivoted clockwise, the outermost peripheral track position can be detected with a high accuracy. The error in the detection of the outermost peripheral track position can be easily adjusted to within a tolerable range.

Figure 9:
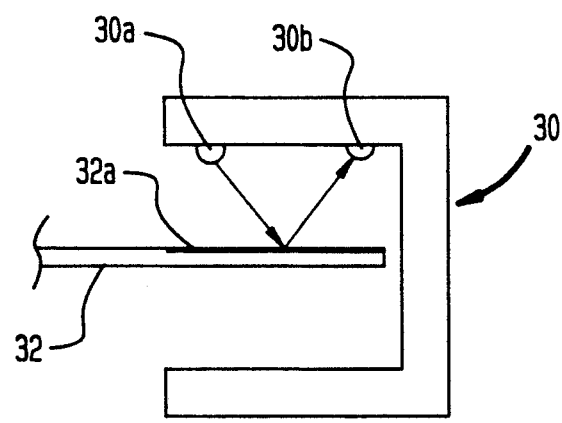
FIG. 9 is a perspective view showing an embodiment of an optical detector which may be used in place of an optical detector used in the embodiments together with a portion of an L-shaped interrupt member.

In the described embodiments, the optical detector is made up of mutually confronting light emitting element and light receiving element. However, it is possible to use in place of such an optical detector an optical detector 30 shown in FIG. 9 having a light emitting element 30a and a light receiving element 30b on the same side. In this case, an L-shaped interrupt member 32 which passes by the optical detector 30 has a mirror surface 30a for reflecting and directing a light emitted from the light emitting element 30a to the light receiving element 30*b* of the optical detector 30. In other words, an optical path is formed between the light emitting element 30*a* and the light receiving element 30*b* when the L-shaped interrupt member 32 reaches such a position that the heads are located at the respective outermost peripheral track position on the disc.

In the described embodiments, the interrupt member has an L-shape but it is of course possible to use an interrupt member which simply projects linearly from the base of the carriage. In addition, the interrupt member may project upwardly in a direction perpendicular to the plane PL. The projecting direction of the interrupt member from the base of the carriage depends on the arrangement of the optical detector.

Further, the present invention is not limited to these embodiments, but various variations and modifications may be made without departing from the scope of the present invention.

What is claimed is:

1. A track position detecting mechanism for a magnetic disc recording and/or reproducing apparatus having at least a magnetic head for recording and/or reproducing signals on and/or from a magnetic disc, said track position detecting mechanism comprising:
   a carriage including a base and movable in a radial direction of the magnetic disc, said base having a surface on which the magnetic head is mounted;
   guide means including a guide shaft which extends in the radial direction of the magnetic disc for guiding said carriage;
   driving means for driving sad carriage in the radial direction of the magnetic disc under a guidance of said guide means;
   optical detector means including a light emitting element and a light receiving element, said optical detector means having a fixed position and forming an optical path between the light emitting element and the light receiving element; and
   an interrupt member provided on said carriage at such a position that said interrupt member interrupts said optical path within said optical detector means when the magnetic head is located at an outermost peripheral track position on the magnetic disc,
   said optical path coinciding with a plane which includes a center axis of said guide shaft, said plane being parallel to said surface of said base of said carriage,
   said interrupt member extending in a predetermined direction from said base, said predetermined direction being approximately perpendicular to said plane and approximately perpendicular to said radial direction,
   said interrupt member and said magnetic head being arranged on the same side of said carriage relative to the guide shaft of said guide means,
   wherein said interrupt member has a tip end and said carriage has an outermost edge, both said tip end and said outermost edge extending an approximately equal distance in a radial direction of the magnetic disc towards the outermost track.

2. A track position detecting mechanism for a magnetic disc recording and/or reproducing apparatus having a least a magnetic head for recording and/or reproducing signals on and/or from a magnetic disc, said track position detecting mechanism comprising:
   a carriage including a base and movable in a radial direction of the magnetic disc, said base having a surface on which the magnetic head is mounted;
   guide means including a guide shaft which extends in the radial direction of the magnetic disc for guiding said carriage;
   driving means for driving said carriage in the radial direction of the magnetic disc under a guidance of said guide means;
   optical detector means including a light emitting element and a light receiving element, said optical detector means having a fixed position and forming an optical path between the light emitting element and the light receiving element; and
   an interrupt member provided on said carriage at such a position that said interrupt member interrupts said optical path within said optical detector means when the magnetic head is located at an outermost peripheral track position on the magnetic disc,
   said optical path coinciding with a first plane which is in a vicinity of and is parallel to a second plane which includes a center axis of said guide shaft, said second plane being parallel to said surface of said base of said carriage,
   said interrupt member extending in a predetermined direction from said base, said predetermined direction being approximately perpendicular to said first plane and approximately perpendicular to said radial direction,
   said interrupt member and said magnetic head being arrange don the same side of said carriage relative to the guide shaft of said guide means,
   wherein said interrupt member has a tip end and said carriage has an outermost edge, both said tip end and said outermost edge extending an approximately equal distance in a radial direction of the magnetic disc towards the outermost track.

* * * * *